United States Patent [19]
Beccaris

[11] Patent Number: 5,127,505
[45] Date of Patent: Jul. 7, 1992

[54] CLUTCH HAVING A PLURALITY OF FRICTION DISCS, ESPECIALLY FOR MOTOR VEHICLES

[75] Inventor: Carlo Beccaris, Santena, Italy
[73] Assignee: Valeo, Paris Cedex, France
[21] Appl. No.: 708,857
[22] Filed: May 31, 1991

[30] Foreign Application Priority Data

May 31, 1990 [FR] France .................. 90.06767

[51] Int. Cl.⁵ .................................... F16D 13/68
[52] U.S. Cl. ..................... 192/70.19; 192/70.18; 192/110 R
[58] Field of Search ............... 192/70.19, 70.16, 70.18, 192/110 R, 70.3, 70.2, 70.25, 109 R, 70.27, 48.1

[56] References Cited

U.S. PATENT DOCUMENTS

| | | | |
|---|---|---|---|
| 3,061,062 | 10/1962 | Smirl | 192/70.18 |
| 3,554,342 | 1/1971 | Spokas | 192/70.18 |
| 3,871,499 | 3/1975 | Kazuma | 192/70.18 X |
| 4,069,905 | 1/1978 | de Gennes | 192/70.18 X |
| 4,640,400 | 2/1987 | Nakane et al. | 192/70.25 |
| 4,778,040 | 10/1988 | Kabayama | 192/110 R |
| 4,892,177 | 1/1990 | Lanzarini et al. | 192/106.2 |

FOREIGN PATENT DOCUMENTS

| | | | |
|---|---|---|---|
| 663929 | 12/1951 | Fed. Rep. of Germany . | |
| 3434305 | 3/1986 | Fed. Rep. of Germany | 192/110 R |
| 3905928 | 9/1989 | Fed. Rep. of Germany . | |
| 806433 | 12/1936 | France | 192/70.25 |
| 951512 | 10/1949 | France . | |
| 2351314 | 12/1977 | France . | |
| 2550834 | 2/1985 | France . | |
| 2629881 | 10/1989 | France . | |
| 551503 | 2/1943 | United Kingdom | 192/70.19 |

*Primary Examiner*—Rodney H. Bonck
*Attorney, Agent, or Firm*—Longacre & White

[57] ABSTRACT

A clutch of the kind having a plurality of friction discs also comprises: a reaction plate; a cover plate; an intermediate crown; and at least one intermediate pressure plate, which is rotatable with the crown but movable axially with respect to the latter; and driving means carried by the crown for effecting the said axial movement, the cover plate having a skirt portion in which apertures are formed. The intermediate crown is in the form of a simple ring, and the driving means comprise at least two dowels projecting axially from the ring that constitutes the intermediate crown, with each dowel engaging slidingly in a hole which is formed in a radially projecting lug of the intermediate pressure plate, each of these lugs lying in one of the apertures in the cover plate skirt portion.

7 Claims, 2 Drawing Sheets

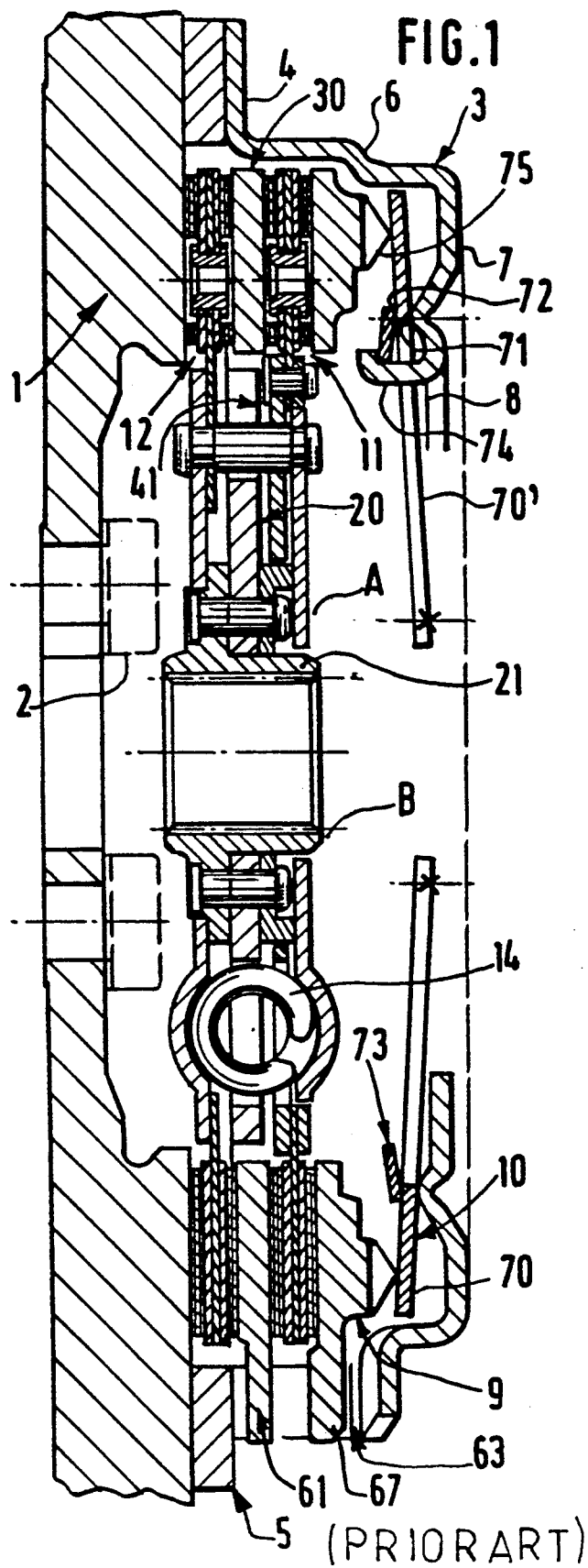

CLUTCH HAVING A PLURALITY OF FRICTION DISCS, ESPECIALLY FOR MOTOR VEHICLES

FIELD OF THE INVENTION

This invention relates to clutches of the kind having a plurality of friction discs, in particular for motor vehicles, the clutch being of the kind which also comprises: a reaction plate; a cover plate fixed to the reaction plate; an intermediate crown fixed to the reaction plate and interposed between the reaction plate and the cover plate; and at least one intermediate pressure plate which is disposed axially between two said friction discs, and which is arranged to rotate with the said crown while being axially movable with respect to the latter, the clutch further including driving means carried by the said crown for effecting the said axial movement.

BACKGROUND OF THE INVENTION

A clutch of the above kind is described in the specification of U.S. Pat. No. 4 892 177 and that of the corresponding published French patent application No. FR 2 628 492A. In FIG. 1 of those specifications, the intermediate pressure plate 30 is provided with tenons 61 for engagement in mortices 62 formed in the crown 5 and defined by local, axial lugs 63. These lugs 63 are so dimensioned that they can lie in the apertures 64 that are formed in the skirt portion 6 of the cover plate.

That arrangement is viable, but it complicates the manufacture of the clutch, particularly because of the machining operations that are necessary on the tenons and mortices.

DISCUSSION OF THE INVENTION

An object of the present invention is to overcome the above drawbacks and to provide a novel crown with driving means which are of low cost but satisfactory in use, besides providing other advantages.

In accordance with the invention, a clutch of the kind defined in the section "Field of the Invention" above is characterised in that the intermediate crown is reduced to the form of a simple ring, being further characterised in that, to constitute the said driving means, the said crown ring carries at least two dowels projecting axially from it, with each dowel engaging slidingly in a complementary hole which is formed in a lug projecting radially from, and fixed with respect to, the intermediate pressure plate, and with the said lug lying in an aperture formed in the skirt portion of the cover plate.

This arrangement simplifies the structure of the intermediate crown, but is also highly effective as regards the driving of the intermediate pressure plate in axial movement. In addition, the only machining operations called for with this arrangement are of a low cost kind, since the lugs of the intermediate pressure plate can be formed by casting and left unmachined. The only machining operation needed in the driving means is that of forming the slide holes which cooperate with the dowels of the crown.

In addition, this arrangement of lugs enables the clutch to be efficiently ventilated, while still preserving a cover plate of a standard type.

In accordance with another feature of the invention, it is easily possible to balance the clutch by forming balancing holes in the crown and/or in the lug of the intermediate pressure plate.

It will be noted that the arrangement according to the invention makes additional space available, in such a way that it is possible easily to fit balancing rivets in the hoods that are formed in the skirt portion of the cover plate.

A preferred embodiment of the invention will now be described, by way of example only and with reference to the accompanying drawings.

BRIEF DESCRIPTION OF THE DRAWINGS

FIG. 1 is a view in axial cross section of the clutch described in the prior art, and specifically in the specifications of U.S. Pat. No. 4 892 177 and the corresponding published French patent application No. FR 2 628 492A.

FIG. 2 is a side view on part of the clutch of FIG. 1, with its reaction plate omitted.

DESCRIPTION OF A PREFERRED EMBODIMENT OF THE INVENTION

Figure 6:
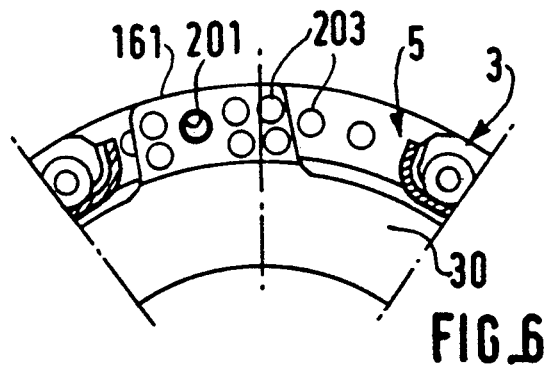
FIG. 6 is a view showing one of the lugs of the intermediate pressure plate in accordance with the invention.
Figure 5:
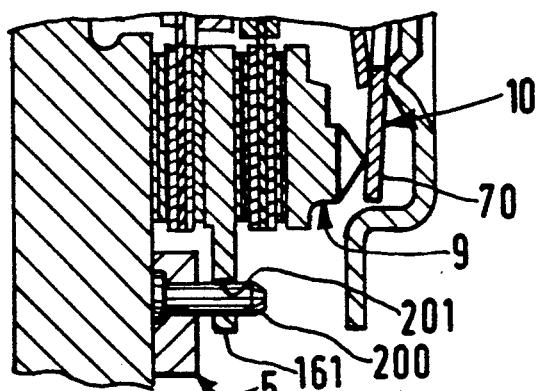
FIG. 5 is a partial view in cross section taken on the line 5—5 in FIG. 3.
Figure 4:
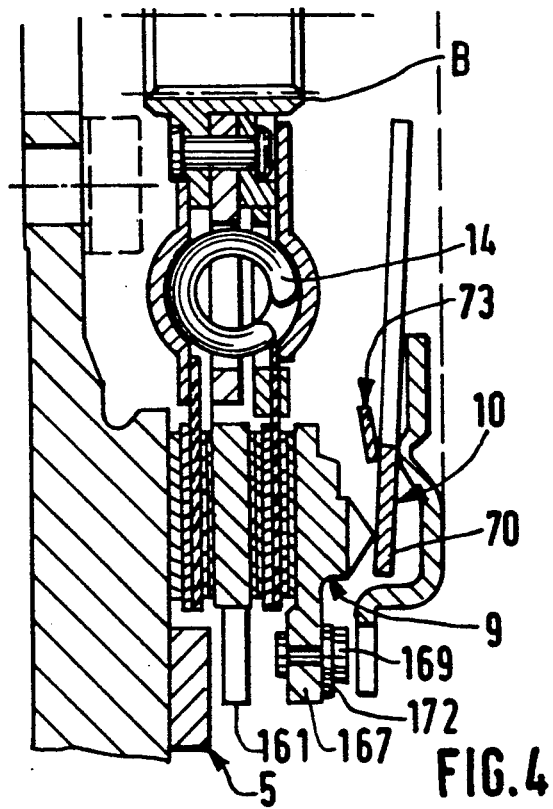
FIG. 4 is a partial view in cross section taken on the line 4—4 in FIG. 3.

The clutch which will now be described is a clutch of the kind having two friction discs, for high speed motor vehicles such as racing or sports cars. In the interests of simplicity, those elements that are common to the prior art and to the invention are indicated in the drawings with the same reference numerals.

The clutch includes a plurality of annular components, namely: a reaction plate 1; a cover plate 3; an intermediate crown 5; a diaphragm 70, 70'; an intermediate pressure plate 30; friction discs 11 and 12; and a hub 21. The reaction plate 1, which is also the engine flywheel, is secured to the crankshaft (not shown) of the engine of a racing car. For this purpose, bolts or studs 2, indicated in broken lines in FIG. 1, are used.

The shape of the cover plate 3 is generally that of a hollow dish. It has a radial securing flange 4 projecting radially outwardly from its outer periphery. The flange 4 is joined to an annular skirt portion 6, extending axially and joined in turn to a base portion 7, which extends radially from its junction with the skirt portion 6 towards the axis of the assembly. With its skirt portion 6, the cover plate 3 surrounds the diaphragm 70, 70'. It also surrounds the intermediate pressure plate 30, the friction disc 11, and a further pressure plate 9, which for convenience will be called the main pressure plate to distinguish it from the intermediate pressure plate 30. The base portion 7 of the cover plate 3 is open in the middle and has a primary abutment 71 in the form of an inwardly directed bead. Radially inward of the abutment 71 and at the outer periphery of its central opening, the base portion 7 has a plurality of hook-shaped assembly lugs 74.

The diaphragm comprises a peripheral portion 70 which is in the form of a Belleville ring, a central portion which is divided into radial fingers 70' separated by radial gaps, and a number of apertures in the region of the roots of the fingers 70'. The gaps between these fingers are open into these apertures. The Belleville ring portion 70 bears internally against the primary abutment 71, while on the outside it bears against an axially projecting stop element 75 of the main pressure plate 9. In this example the stop element 75 is divided into a number of separate segments.

The assembly lugs 74 extend through the above mentioned apertures, beyond which they ate bent radially outwardly, as can be seen in FIG. 1, to give them their hook shape. A crown ring 73, lodged as shown within the assembly lugs and bearing against the back of the ring portion 70 of the diaphragm, provides a secondary abutment for the ring 70, as indicated at 72 in FIG. 1. In this way, the diaphragm is mounted in a tilting manner on the cover plate 3, and engages on the latter so as to urge the main pressure plate 9 towards the reaction plate 1, and so as therefore to grip the friction discs 11 and 12.

The friction discs 11 and 12 are part of a friction clutch which comprises two coaxial parts A and B. These coaxial parts are mounted for relative rotation with respect to each other, against the action of circumferentially acting resilient means in the form of a set of damping springs 14. The two parts of the clutch comprise a first part, consisting of two radial plates joined together at a fixed axial spacing by means of axial spacers, and a second part comprising a radial damper plate 20 which is disposed in an axial position lying between the two radial plates of the first clutch part.

It is the first clutch part, A, that carries the two friction discs 11 and 12. The first of these friction discs, 11, comprises a support 41 which is mounted for axial movement with respect to one of the radial plates, by virtue of openings through which the above mentioned axial spacers extend. The support 41 lies axially between the two radial plates of the first clutch part A.

The intermediate pressure plate 30 is interposed axially between the two friction discs 11 and 12, and more particularly between friction pads carried by the discs 11 and 12. In this way the intermediate pressure plate 30 is part of the friction clutch.

It will be recalled that when the clutch is engaged, the engine torque is transmitted from the friction pads of the friction discs 11 and 12 to the radial plates of the first clutch part, and from thence to the hub 21 through the damping springs 14. The hub 21 is carried by the input shaft of the gearbox so that the latter rotates with it. For this purpose the hub and input shaft are splined, in this example.

The friction disc 12, the intermediate pressure plate 30 and the friction disc 11 are arranged in that order between the plates 1 and 9. The intermediate pressure plate 30 is mounted for rotation with the reaction plate 1 and cover plate 3, by means of the driving crown 5, the arrangement being such that the intermediate pressure plate is able to undergo some axial movement. The crown 5 is fixed to the reaction plate 1, and is inserted axially between the latter and the securing flange 4 of the cover plate 3. In this example, the flange 4 is secured, with the crown 5, to the reaction plate 1 by means of fasteners such as bolts or studs (not shown). The heads of these fasteners bear against the flange 4, with their shanks passing through the cover plate and the crown 5 via holes indicated in FIG. 2 at 66.

The cover plate 3 is of a standard type, with its skirt portion 6 having apertures 64, each of which is bounded by a radial hood 65 which is joined to the flange 4.

Figure 3:
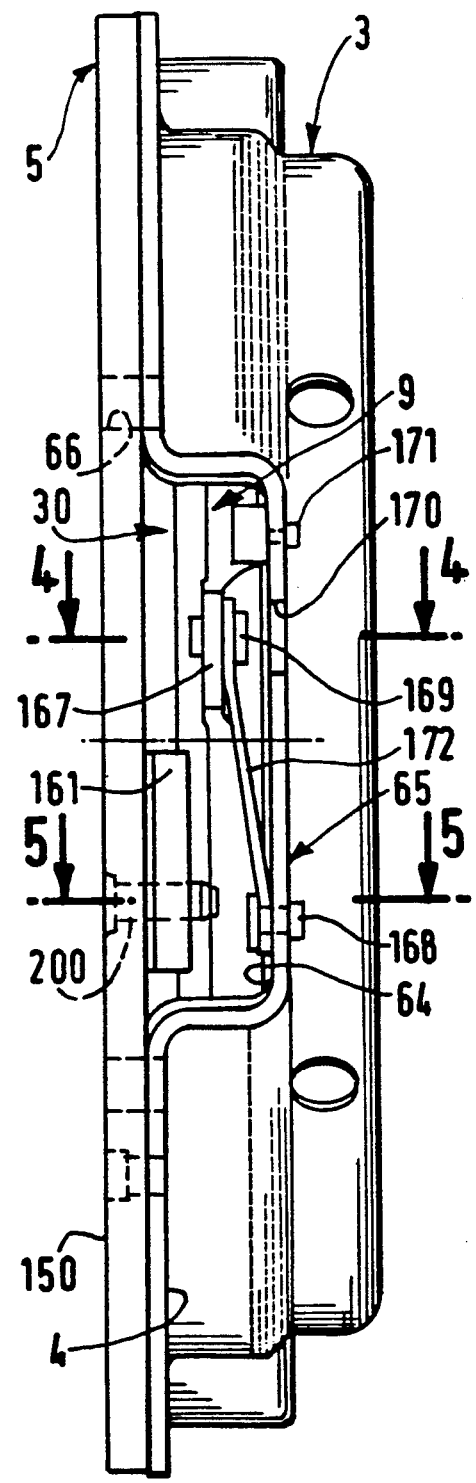
FIG. 3 is a view similar to FIG. 2 showing the intermediate crown, but without its drive means according to the invention.

Tangential tongues 172, seen in FIG. 3, are secured to the hoods 65 and couple the main pressure plate 9 to the cover plate 3 for rotation together, while permitting the main pressure plate 9 to undergo axial movement with respect to the cover plate 3. The tongues 172 are resiliently deformable. Each is fixed at one end to the corresponding hood 65 by means of suitable fasteners, which in this example are rivets 168. At its other end, each tongue 172 is fastened to a corresponding radial lug 167 of the main pressure plate 9. In this example each tongue 172 is fastened to the associated lug 167 by means of a rivet 169. Each lug 167 extends radially into the adjacent aperture 64. In a modification, screws or other suitable fastening means may be used in place of the rivets 168 and/or 169.

The intermediate pressure plate 30 is mounted for rotation with the crown 5, but is movable axially with respect to the latter, this movement being permitted by drive means carried by the crown 5.

FIG. 3 shows a clutch incorporating features of the invention, as compared with FIG. 2 which shows a clutch of the prior art. As can clearly be seen from FIG. 3, the intermediate crown 5 here consists of a simple ring 150. In addition, the ring 150 carries at least two dowels 200 which project axially from it, and which define the drive means mentioned above. Each dowel 200 engages slidingly in a complementary hole 201 (see FIG. 6) which is formed in a corresponding one of a plurality of lugs 161 projecting radially from the intermediate pressure plate 30. The lugs 161 are fixed to the intermediate pressure plate 30. Each lug 161 lies in a respective one of the apertures 64 in the skirt portion 6 of the cover plate 3.

It will be noted that the outer diameter of the friction discs 11 and 12 determines (according to the particular application to which the clutch is to be put) the inner diameter of the ring 150. It will also be noted that the number of hoods 65 is three in this example, as is the number of lugs 161 and dowels 200. Thus the latter are spaced apart at equal intervals of 120°, the outer diameter of the ring 150 being the same as that of the flange 4. The width of the hood 65 is, here, smaller than that of the flange 4. However, the number of dowels 200, lugs 161, lugs 167, and hoods 65 does of course depend on particular applications, and also on the size of the cover plate 3. Thus there may be more than three of each of these components.

In addition, some of the hoods 65 may even be without any lugs 161, the ring 150 being interposed axially between the flange 4 and the reaction plate 1. In the example shown, the dowels 200 are cylindrical, with a circular cross section, and the complementary holes 201 are formed directly in the lugs 161, again with circular cross sections.

In this example, the lugs 161 are integral with the intermediate pressure plate 30 and are formed by casting. Their outer surfaces are left rough, the only machining that is necessary being in the formation of each hole 201 to allow sliding movement of the associated dowel 200 through it. The lugs 161 project generally radially outwardly from the outer periphery of the intermediate pressure plate 30, within the overall contour of the ring 150 beyond the hoods 65. It follows that it is easy to form balancing holes 203 (FIG. 6) in the lug 161 and/or in the crown 5, so as to obtain dynamic balance of the clutch. The lugs 161 also encourage ventilation of the clutch, in combination with the depth of the hoods 65.

In this example the lugs 161 are offset circumferentially with respect to the lugs 167 of the main pressure plate 9; the cylindrical dowels 200 lie generally in line with the rivets 168. Because of this, it is possible to fit a balancing rivet 171 on the hood 65, using the space which is available between the lug 167 and the walls of the hood itself. This can easily be seen in FIG. 3.

It will be recalled that when the clutch is engaged, the friction discs 11 and 12 are gripped between the main pressure plate 9 and the reaction plate 1, with the intermediate pressure plate 30 intervening; and that the engine torque is transmitted through the clutch to the input shaft of the gearbox. In order to disengage the clutch, it is only necessary to apply, by means of a clutch release bearing (not shown), a thrust on the ends of the diaphragm fingers 70' so as to cause the diaphragm to pivot and so release the friction discs 11 and 12 and the main pressure plate 9. The pressure plate 9 is subject to a return force exerted by the tongues 172.

As will be clear from the foregoing description and from the drawings, during assembly of the clutch, the intermediate pressure plate 30 can be mounted by simply offering the holes 201 axially on to the dowels 200, which act to centre the various components and which also drive the intermediate pressure plate 30 in axial movement. The dowels 200 may be formed by moulding or casting with the crown 150. In a modification, they may be separate members secured to the crown 150, for example by an interference fit in an aperture formed in the crown 150. It is equally possible to secure them adhesively or by threaded engagement, and in the latter case the dowels 200 are provided with an appropriate threaded portion.

In no case does the head of each dowel 200 project axially from that face of the crown 5 that is directed towards the reaction plate 1, i.e. the left hand face as seen in FIG. 3. The shanks of the dowels 200 extend axially towards the base portion 7 of the cover plate 3, with the lugs 161 being disposed axially between the crown 150 and the lugs 167 of the main pressure plate 9. The lugs 161 may be of greater circumferential width. Each lug 161 and the associated balancing rivet 171 are arranged circumferentially on either side of the adjacent lug 167. The thickness of the ring 150 depends on the thickness of the friction discs 11 and 12, while the size of the dowels 200 depends on that of the aperture 64.

The present invention is of course not limited to the embodiments described. In particular, the clutch may be of the "pull" type, with a diaphragm in which the outer portion of its Belleville ring portion 70 bears on an abutment carried by the cover plate, while at its inner periphery the Belleville ring portion exerts a force on the main pressure plate by engagement against the latter.

Equally, in place of a diaphragm there may be a plurality of coil springs in combination with declutching levers. Also, the number of friction discs may be increased, as may be the number of intermediate pressure plates. In that case the centring dowels 200 will be of such greater length as may be required.

The friction discs 11 and 12 may cooperate directly with the hub 21, the latter then having a splined, integral central portion for cooperation with the gearbox input shaft, together with an intermediate radial web carrying a fork having two branches which are separated from each other by a radial gap. In this latter case, axial grooves are formed so as to traverse each branch of the fork, for sliding mounting of the friction discs, the latter having splines complementary to the splines mentioned above.

The friction discs may be in a carbon based material, as may be the intermediate pressure plate 30. The main pressure plate 30 and the reaction plate 1 are then overlaid with an intermediate disc, also in a carbon material, for cooperation with the friction discs. Such intermediate discs are fixed to the reaction plate 1 and the main pressure plate 9.

The ring 150 may be secured directly on to the reaction plate, independently of the cover plate. Finally, each hole 201 may constitute the internal bore of a sliding ring mounted in a hole formed in the lug.

What is claimed is:

1. A clutch comprising:
   a reaction plate;
   a cover plate secured to said reaction plate, the cover plate having a skirt portion forming a plurality of hoods defining apertures in the skirt portion;
   an intermediate crown secured to the reaction plate and interposed axially between the reaction plate and the cover plate, wherein the intermediate crown is in the form of a simple ring;
   two friction discs;
   at least one intermediate pressure plate disposed axially between said friction discs, the intermediate pressure plate having at least two lugs projecting radially from the intermediate pressure plate, each said intermediate pressure plate lug extending through one of said apertures of the skirt portion of the cover plate;
   drive means mounting the intermediate pressure plate for rotation with said crown and for axial movement with respect to the crown, said drive means comprising at least two dowels projecting axially from the intermediate crown ring, the drive means further comprising a hole formed in each said intermediate pressure plate lug complementary to a corresponding one of said dowels, with each dowel engaging in one of said holes;
   a main pressure plate, means mounting the main pressure plate for rotation with the cover plate and for axial movement with respect to the cover plate, the main pressure plate having lugs extending into said apertures of the skirt portion of the cover plate; and
   a plurality of resiliently deformable tongues each defining a first end and a second end, each tongue being secured at its first end to a corresponding one of said hoods of the cover plate, the second end of each said tongue being secured to one of said lugs of the main pressure plate;
   wherein each said lug of the intermediate pressure plate is offset circumferentially with respect to the associated lug of the main pressure plate.

2. A clutch according to claim 1, wherein said lugs of the intermediate pressure plate are formed with axially oriented balancing holes.

3. A clutch according to claim 1, wherein the intermediate crown ring is formed with axially oriented balancing holes.

4. A clutch according to claim 1, further comprising a balance rivet fitted on at least one of the hoods.

5. A clutch according to claim 1, further comprising fastening members securing the tangential tongues to the hoods, each said dowel secured to the crown being adjacent to said fastening members.

6. A clutch according to claim 5, wherein the cover plate has a radial securing flange on its outer periphery, said lugs of the intermediate pressure plate extending within the overall contour of the intermediate crown ring beyond the associated one of said hoods of the cover plate, the hoods being more narrow than said flange of the cover plate.

7. A clutch according to claim 1, wherein each said hole complementary to one of said dowels is formed directly in the corresponding one of said lugs of the intermediate pressure plate.

* * * * *